US006140617A

United States Patent [19]

Berkcan et al.

[11] Patent Number: 6,140,617

[45] Date of Patent: Oct. 31, 2000

[54] COOKTOP CONTROL AND MONITORING SYSTEM INCLUDING DETECTING PROPERTIES OF A UTENSIL THROUGH A SOLID-SURFACE COOKTOP

[75] Inventors: Ertugrul Berkcan, Niskayuna; Emilie Thorbjorg Saulnier, Rexford, both of N.Y.

[73] Assignee: General Electric Company, Schenectady, N.Y.

[21] Appl. No.: 09/422,768

[22] Filed: Oct. 22, 1999

[51] Int. Cl.[7] .................................. H05B 3/68; G01J 5/00

[52] U.S. Cl. ...................................... 219/446.1; 250/338.1

[58] Field of Search .............................. 219/445.1, 446.1, 219/448.11, 460.1, 518; 250/338.1, 338.3, 339.06, 339.11, 339.14, 341.7, 341.8, 362, 363.01

[56] References Cited

U.S. PATENT DOCUMENTS

| | | | |
|---|---|---|---|
| 3,887,471 | 6/1975 | Stotlar | 250/338.1 |
| 3,994,586 | 11/1976 | Sharkins et al. | 250/339.06 |
| 4,237,368 | 12/1980 | Welch . | |
| 4,578,584 | 3/1986 | Baumann et al. | 250/338.1 |
| 4,647,776 | 3/1987 | Kern et al. | 250/339.04 |
| 5,126,536 | 6/1992 | Devlin | 219/497 |
| 5,138,135 | 8/1992 | Husslein et al. . | |
| 5,243,172 | 9/1993 | Hazan et al. | 219/447.1 |
| 5,424,512 | 6/1995 | Turetta et al. | 219/447.1 |
| 5,430,427 | 7/1995 | Newman et al. . | |
| 5,893,996 | 4/1999 | Gross et al. | 219/447.1 |
| 5,900,174 | 5/1999 | Scott | 219/447.1 |

*Primary Examiner*—Sang Paik
*Attorney, Agent, or Firm*—John F. Thompson; Jill M. Breedlove

[57] ABSTRACT

A system is provided for detecting cooking utensil-related properties through a solid-surface cooktop, including the presence/absence, removal/placement, and other properties (e.g., size) of a cooking utensil on the cooktop. An energy source heats the contents of a cooking utensil placed on the cooktop; and an optical radiation source is controlled to provide an interrogation scheme for detecting the utensil properties. The utensil property detecting system may be part of a monitoring system for monitoring the properties of the cooking utensil, or may be part of a control system for controlling the energy source based on the detected utensil properties, or both.

34 Claims, 8 Drawing Sheets

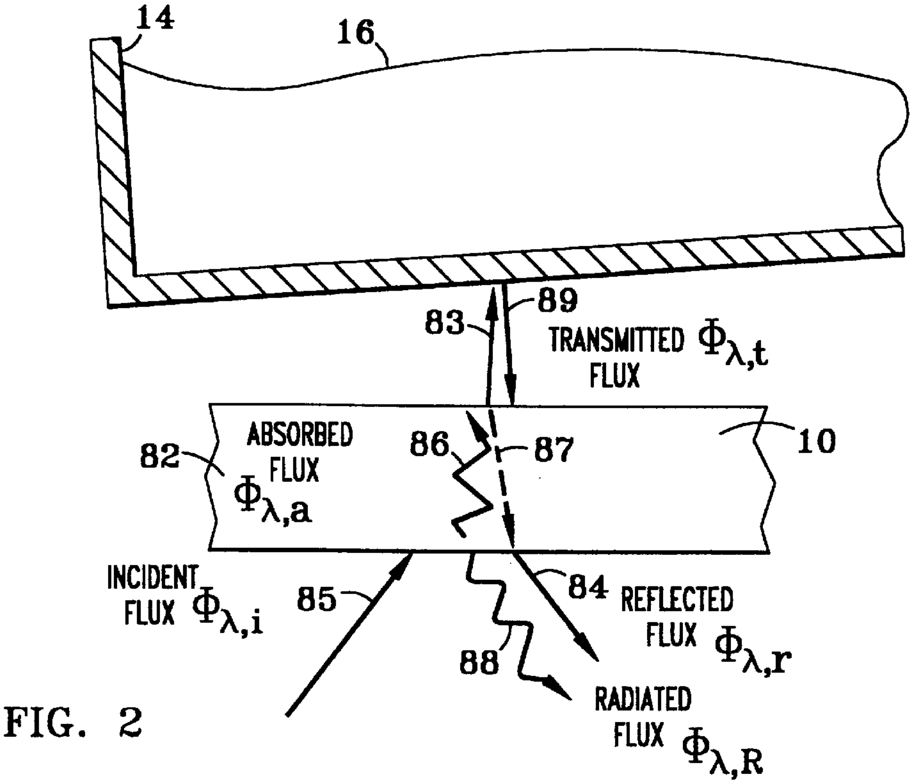
FIG. 2
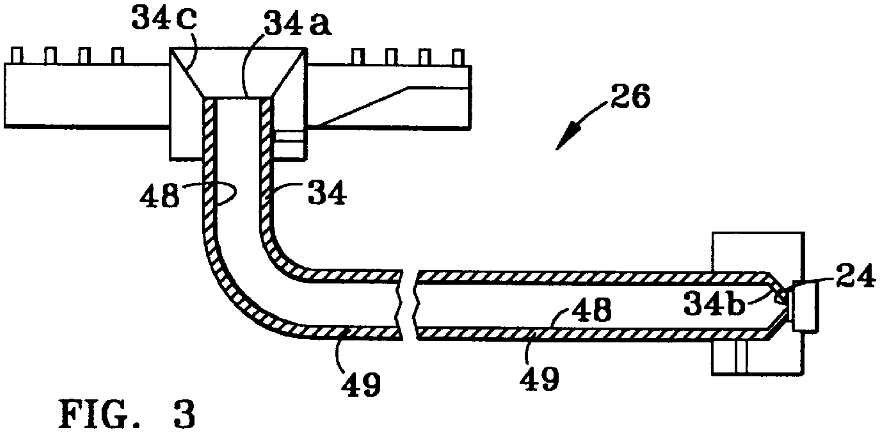
FIG. 3
FIG. 4
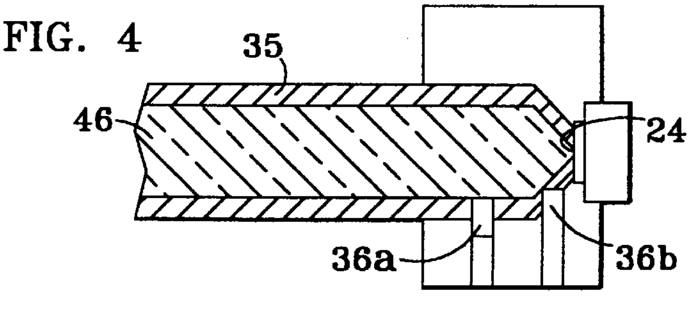

COOKTOP CONTROL AND MONITORING SYSTEM INCLUDING DETECTING PROPERTIES OF A UTENSIL THROUGH A SOLID-SURFACE COOKTOP

BACKGROUND OF THE INVENTION

The present invention relates generally to monitoring and/or controlling an electric cooktop, and, more particularly, to a system for generating control signals responsive to properties of a cooking utensil detected through a solid surface cooktop.

Recently, standard porcelain enamel cooktop surfaces of domestic ranges have been replaced by smooth, continuous-surface, high-resistivity cooktops located above one or more heat sources, such as electrical heating elements or gas burners. The smooth, continuous-surface cooktops are easier to clean because they do not have seams or recesses in which debris can accumulate. The continuous cooktop surface also prevents spillovers from coming into contact with the heating elements or burners. Exemplary cooktops comprise glass-ceramic material because of its low coefficient of thermal expansion and smooth top surface that presents a pleasing appearance.

Devices are known for detecting the presence of a utensil on a cooking appliance, such as those dependent on contact with the cooking utensil disposed on an electric heating element or on the utensil support of a gas burner. Such contact-based systems, however, have not proven to be feasible for continuous-surface cooktops, and especially glass-ceramic cooktops due to the difficulties of placing contact sensors thereon. Cooking utensil contact sensors generally disrupt the continuous cooktop appearance, weaken the structural rigidity of the cooktop, and increase manufacturing costs. Also, such contact-based systems are not inherently reliable on smooth-surface cooktops because cooking utensils with warped or uneven bottoms may exert varying forces on the contact sensors and give a false contact indication.

Accordingly, it is desirable to provide a system for detecting cooking utensil characteristics or utensil-related, through-the-cooktop-surface properties, such detection being independent of a cooking utensil's composition, flatness of bottom, or weight. It is further desirable that such a system generate energy source control signals based on detecting through the glass-ceramic cooktop the presence/absence, removal/placement, or size of a cooking utensil on the cooktop.

BRIEF SUMMARY OF THE INVENTION

An exemplary system of the present invention detects cooking utensil-related properties through a solid-surface cooktop, including the presence/absence, removal/placement, and other properties (e.g., size) of a cooking utensil on the cooktop. At least one controllable energy source (e.g., comprising electric or gas heating elements or induction heating sources) heats the contents of a cooking utensil placed on the cooktop. A radiation source (e.g., an optical radiation source) is controlled to provide an interrogation scheme for detecting the utensil properties. The utensil property detecting system may comprise part of a monitoring system for monitoring the properties of the cooking utensil, or may comprise part of a control system for controlling the energy source based on the detected utensil properties, or both.

The cooking utensil property detecting system comprises at least one sensor for detecting radiation affected by the cooking utensil placed on the upper surface of a cooktop. In particular, the sensor comprises at least one detector situated below the lower surface of the cooktop for detecting through the cooktop the radiation affected by the utensil. A second sensor may be used for sensing light reflected by the cooking utensil. The source of light reflected by the cooking utensil may be from ambient light, or light from the energy source, or another source, such as a light emitting diode (LED).

In one embodiment, the sensor comprises at least one optical detector for detecting infrared radiation from the energy source reflected by the cooking utensil onto the cooktop. The existence and level of reflected radiation is detected by a sensor assembly opening into a heating chamber located between the energy source and the lower surface of the cooktop. The degree of reflected radiation is dependent upon the type, size and other characteristics of the cooking utensil, as well as the power level of the energy source and the temperature of the cooktop. The reflection characteristics of various types and sizes of cooking utensil are determined experimentally and stored as data within a processor, which receives the signal from the optical detector. The processor performs an optical interrogation, processes the received signal, and compares the result to the stored data, thereby determining the type, size and other characteristics of the cooking utensil. Based on the detected signals, the processor provides signals indicative thereof for monitoring the cooktop and utensil. Additionally, the detected signals may be used by the processor to provide control signals to the energy source in order to optimally support the particular cooking utensil or cooking mode.

BRIEF DESCRIPTION OF THE DRAWINGS

FIG. 2 shows a partial cross sectional view of a glass-ceramic cooktop and a cooking utensil being moved away from the top surface of the cooktop;

FIG. 3 is a cross sectional view of a waveguide assembly utilized with the system according to an exemplary embodiment of the present invention;

FIG. 4 is a partial cross sectional view of an alternative embodiment of the exit end portion of the waveguide of FIG. 3;

DETAILED DESCRIPTION OF THE INVENTION

Figure 1:
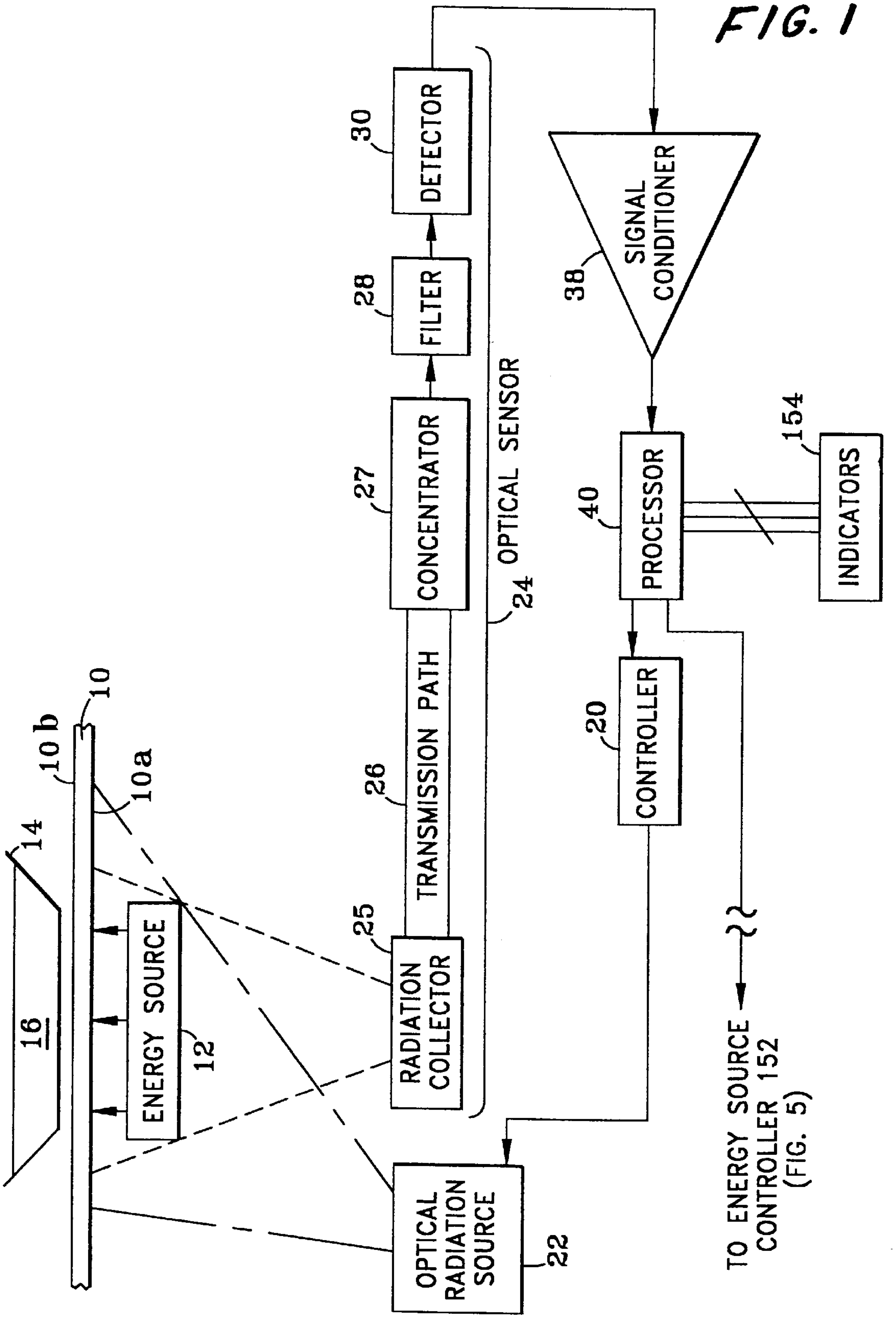
FIG. 1 is a block diagram illustrating a glass-ceramic cooktop incorporating a cooking utensil property detecting system according an exemplary embodiment of the present invention.

FIG. 1 illustrates a cooktop 10 made of any suitable solid material, preferably glass-ceramic, having a lower surface 10*a* and an upper surface 10*b*. At least one controllable energy source, represented schematically by a block 12, is located beneath the lower surface 10*a*. Such an energy source may comprise any suitable energy source, such as electric or gas heating elements or induction heating sources, for example. A cooking utensil 14 (e.g., a pot or pan) is illustrated as being placed on the upper cooking surface 10*b*. Contents of the cooking utensil to be heated are represented by the numeral 16. An energy source controller 20 is shown as providing signals to energy source 12.

FIG. 1 further illustrates an optical radiation source 22 for providing and directing radiation toward the cooking utensil on the cooktop. An optical sensor 24 for sensing radiation affected by the cooking utensil is illustrated as comprising a radiation collector 25, a transmission path 26, a concentrator 27, a filter 28, and at least one optical detector 30. The optical sensor 24 provides signals indicative of cooking utensil 14 properties via a signal conditioner 38 to a processor 40. The portion of the cooktop lower surface 10*a* that contributes to the radiation collected by the radiation collector 25 or that can be seen by the radiation collector 25 is referred to as the field of view.

Optical sensor 24 is illustrated as being located directly below the energy source 12 for monitoring the glass-ceramic cooktop 10. Optical radiation reflected from the cooking utensil 14 passes through the cooktop 10, is collected by radiation collector 25, and impinges on the optical detector 30 via the transmission path 26, concentrator 27 and filter 28. The filter 28 is used to limit the spectrum of the sensed radiation such that the radiation suitably represents the desired properties of the utensil 14. In particular, the filter 28 can be used to limit the region of wavelengths to those to which the glass-ceramic cooktop 10 is substantially transparent, thereby enabling the detector 30 to more easily determine through the cooktop 10 surface the presence, absence and/or other characteristic properties of the cooking utensil 14. The filter 28 can be also utilized to minimize interference caused by reflected radiation from the glass, ambient lighting and non-glass reflection by limiting the wavelength region to those with minimum reflectivity.

Optical detector 30 may be temperature compensated for some applications. Such temperature compensation may be accomplished using a signal indicative of the ambient temperature around optical detector 30. For example, a temperature sensor, such as a thermistor, may be used which measures the temperature of the optical sensor and which optionally is connected to software programs in processor 40 using separate channels of an A/D converter. Alternatively, in another embodiment, temperature compensation is accomplished using a separate hardware implementation.

FIG. 2 shows a partial cross sectional view of glass-ceramic cooktop 10 with cooking utensil 14 being moved with respect to the top surface of the cooktop. FIG. 2 also shows various components of optical flux. Optical flux is the radiant power traversing a surface, typically measured in Watts. Illustrated components of the optical flux include incident flux 85, reflected flux 84, absorbed flux 82, transmitted flux 86, and radiated flux 88. The transmitted flux 86 gives rise to a further radiated and transmitted component 83, which contributes to the heat transfer properties of the glass ceramic. The transmitted component 83 is affected by the presence or absence of cooking utensil 14 and is reflected back as the reflected component 89.

Exemplary optical detectors 24 include thermal detectors, quantum detectors, and other detectors (or sensors) that are sensitive to the desired infrared radiation region (i.e., broad-band sensors). Quantum detectors, or photon detectors, have a responsive element that is sensitive to the number or mobility of free charge carriers, such as electrons and holes, due to the incident infrared photons. Examples of photon detectors include silicon type, germanium type, and InGaAs type, among others. Thermal detectors have a responsive element that is sensitive to temperature resulting from the incident radiation, exemplary thermal detectors including thermopile and bolometric detectors. A second relatively narrow band quantum detector, such as a silicon or germanium photo-diode, is used as an alternative to a broadband detector in order to separate the wavelength sensitivity and increase the specificity and sensitivity of the sensor assembly.

In one embodiment, as illustrated in FIG. 3, transmission path 26 comprises a waveguide 34. In FIG. 3, waveguide 34 is illustrated as having an inlet end 34*a* and an exit end 34*b* through which the infrared radiation passes to impinge upon the optical detector 24. The inlet end 34*a* is illustrated as having a radiation collector 34*c* which concentrates the radiation entering the transmission path. In the illustrated embodiment, the waveguide 34 has a hollow, tubular configuration having an inner surface which provides good infrared radiation reflectivity and very low emissivity. The radiation collector 34*c* preferably has a shape including a frustoconical surface, a paraboloid of revolution, and a compound parabolic concentrator. Similarly, the exit end 34*b* may have a concentrator so as to concentrate further the radiation exiting from the transmission path onto the optical detector 24.

A hollow, tubular waveguide 34, such as illustrated in FIG. 3, comprises a suitable metal (e.g., copper) with an internal coating 48 that is a good infrared reflector and has very low emissivity, e.g., gold. To prevent the metal tube material from bleeding into the internal coating 48, a barrier layer 49 may be deposited between the metal tube and the internal coating. Such a barrier layer comprises any suitable material, such as nickel or nichrome.

FIG. 4 shows an alternative embodiment wherein the transmission path comprises a waveguide 35 made of a solid material that is optically conducting to the radiation in the selected wavelength range, such as glass, or is filled with $Al_2O_3$ or other suitable infrared transmitting material 46.

Alternative embodiments of the cooking utensil property detecting system comprise more than one optical detector 24. For example, FIG. 4 shows an additional optical detector located at 36*a* and/or within the concentrating surface at 36*b*. Such a multiple detector configuration may comprise optical detectors with different (e.g., two) ranges of wavelength sensitivity.

In one embodiment, regardless of the location of the optical detector(s) 24, the energy source 12 must be activated, or turned on, before the detector 24 can detect reflected radiation. In alternative embodiments, the detector 24 is positioned to detect optical radiation affected by the cooking utensil 14 due to ambient light or a separate light source, such as an LED.

Figure 5:
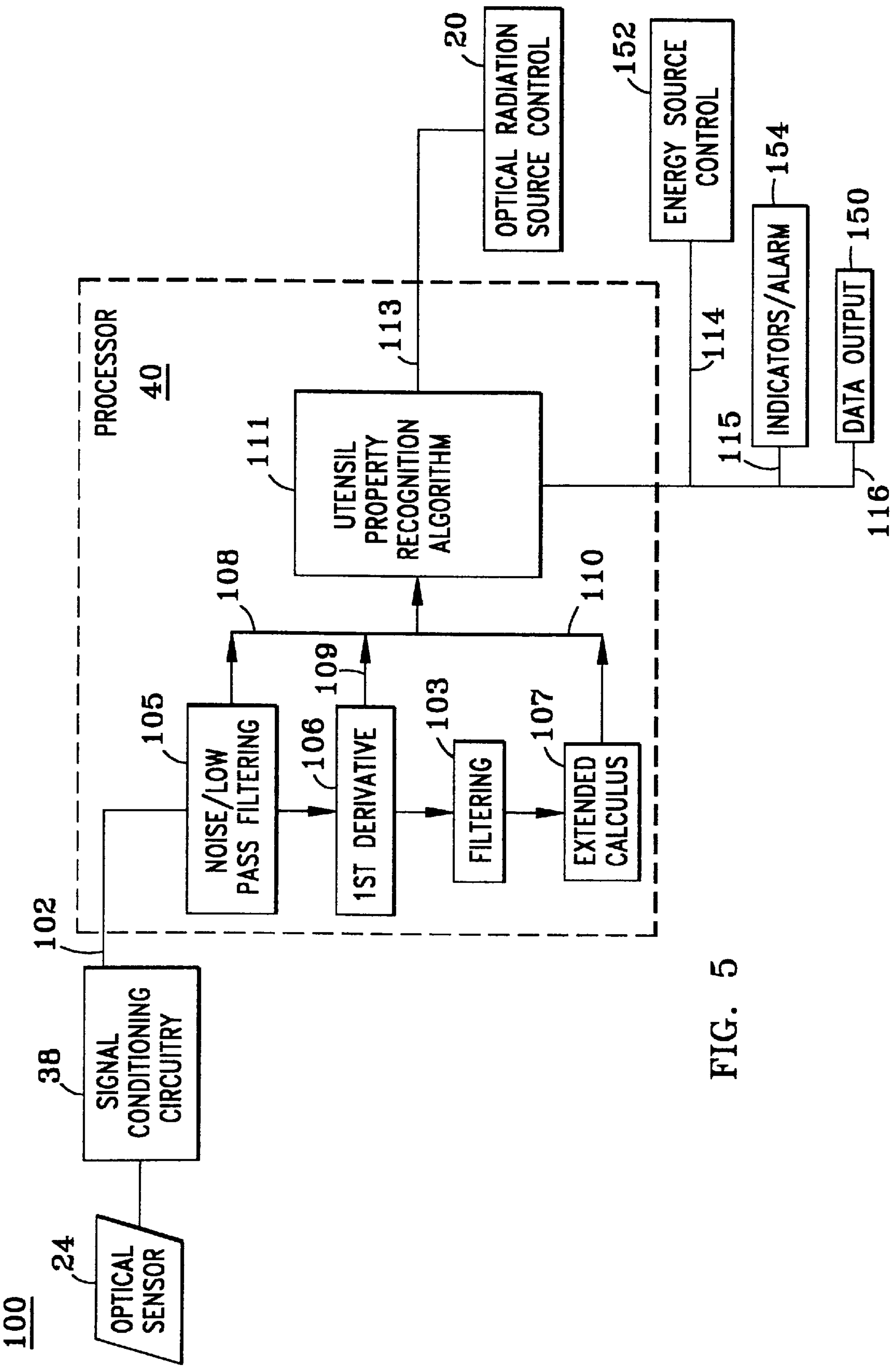
FIG. 5 is a block diagram illustrating a cooktop utensil detector system according to an exemplary embodiment of the present invention.

FIG. 5 is a block diagram showing the components of one embodiment of a detector system 100, including sensors connected to processor 40 for providing input signals to inter-connected calculator functions located within the processor 40. More particularly, optical sensor 24 is connected to pass a signal to signal conditioning circuitry 38 which is connected to the processor 40. The conditioned optical signal calculated by circuitry 38 is passed via signal line 102 to a filtering/averaging calculator 105. The result calculated by calculator 105 is provided to a first derivative calculator 106 and is also provided via a signal line 108 to a utensil property recognition algorithm calculator 111, which may comprise a software program or which may be embodied in hardware.

The calculated output of the first derivative calculator 106 is provided to a second filtering/averaging calculator 103 and via a signal line 109 to the utensil property recognition algorithm calculator 111. The calculated output of the second filtering/averaging calculator 103 is provided to an extended calculus calculator 107, which in turn provides an extended calculus signal, e.g., a second derivative of the optical signal, via a signal line 110 to the utensil property recognition algorithm calculator 111. Calculator 111 is connected via a data line 116 to a data output circuit 150, via a data line 114 to an energy source control 152, and via a data line 115 to an alarm indicator 154. Alarm indicator 154 may comprise an audible, visual or data indicator for indicating that a predetermined utensil property has been detected. Calculator 111 is also connected via a data line 113 to optical radiation source control 20.

Filters 103 and 105 are used to limit noise in the optical signal in order to simplify the robust determination of the first order derivative as well as the result of the extended calculus result, such as, for example, the second order derivative.

Figure 6:
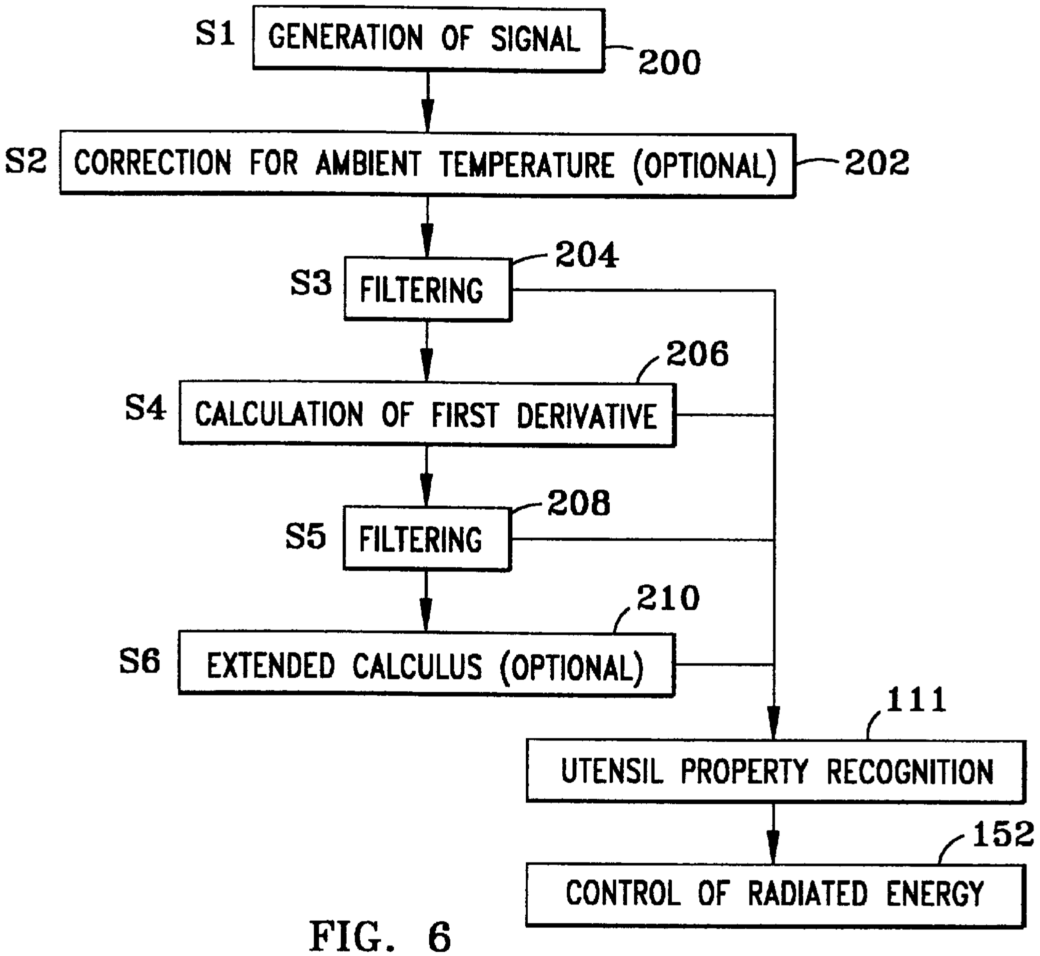
FIG. 6 is a flow chart illustrating an exemplary method of the system shown in FIG. 5.

FIG. 6 is a flow chart illustrating an exemplary method of system 100 shown in FIG. 5. The method illustrated in FIG. 6 begins with step S1 (200), including the generation and conditioning of an optical signal. In one embodiment, in step S2 (202), the conditioned signal is temperature-compensated. The input to step S3 (204) comprises the output of step S1 or optional step S2. Step S3 comprises a filtering calculation, such as filtering or averaging repeatedly or, alternatively, recursively, in order to simplify the determination of utensil properties. The specific implementation depends on the desired utensil properties. The filter calculation substantially removes the noise and enables a robust calculation of the first derivative of the filtered signal in step S4 (206). In one exemplary embodiment, the filter calculation is implemented in such a way that each signal value is replaced by the statistical mean of a number n of prior signal values. The number of points n is a function of the tolerable response delay and is selected such that the utensil properties recognition algorithm determines utensil properties in near real time. In this embodiment, the number n of points is selected to be relatively small (such as, for example, 3–10) so as not to distort any sudden changes in the signal corresponding to utensil properties or the result of the interrogation.

In step S4, the first derivative of the filtered signal is calculated. In particular, an incremental derivative signal is calculated at predetermined time intervals by determining the difference between the current and previous values of the filter signal divided by the time step between the two readings. The result is a smooth and slightly delayed first derivative of the optical signal or signal representative of the power. For small values of n, the delay is very small.

Optionally, the first derivative obtained in step S4 is provided to step S5 (208), in which a second filtering calculation of the derivative is computed, thereby removing noise and enabling a robust calculation of the extended calculus signal, e.g., a second derivative of the signals in step S6 (210). Whether or not any signal characteristics beyond the first derivative are desirable depends on the utensil properties of interest for a particular application. This second filtering operation is implemented in a substantially similar way to the filtering calculation step S3.

The values calculated in steps S4 through S6 are provided to the utensil property recognition algorithm 111. In an exemplary embodiment, algorithm 111 is an evolutionary algorithm that updates comparison rules in accordance with calculated differences between detector signal levels and known signal patterns. Output from algorithm 111 is communicated to an energy source control 152, as illustrated in FIG. 5.

Figure 7:
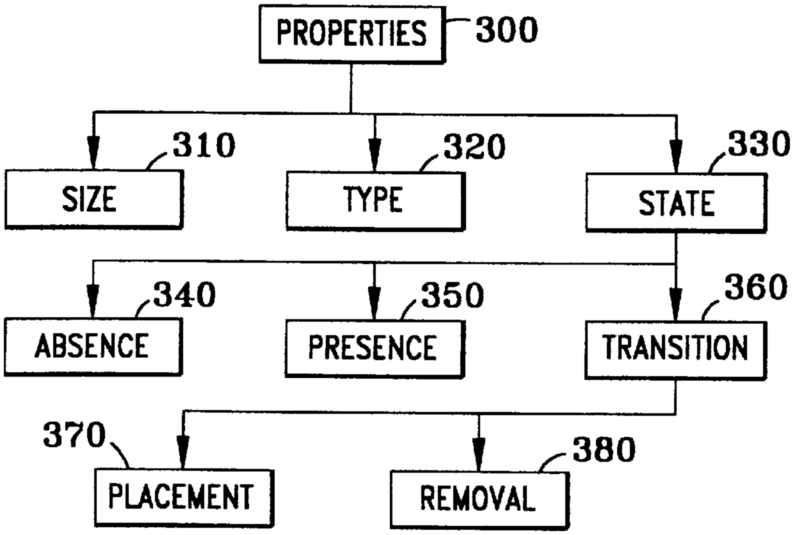
FIG. 7 is a block diagram illustrating exemplary utensil properties and their relationships.

FIG. 7 is a schematic block diagram illustrating utensil properties. Utensil properties are defined by detection of radiation affected by the utensil. Three exemplary properties 300 are utensil size 310, utensil type 320, and utensil state 330. Utensil size 310 generally indicates relative size (small or large) among commonly used utensils. Utensil type 320 refers to whether the utensil is dark or shiny. The utensil state 320 property is shown as comprising three characteristics as follows: utensil absence 340, utensil presence 350, and utensil transition 360, where utensil transition comprises either utensil placement 370 or utensil removal 380.

Figure 8:
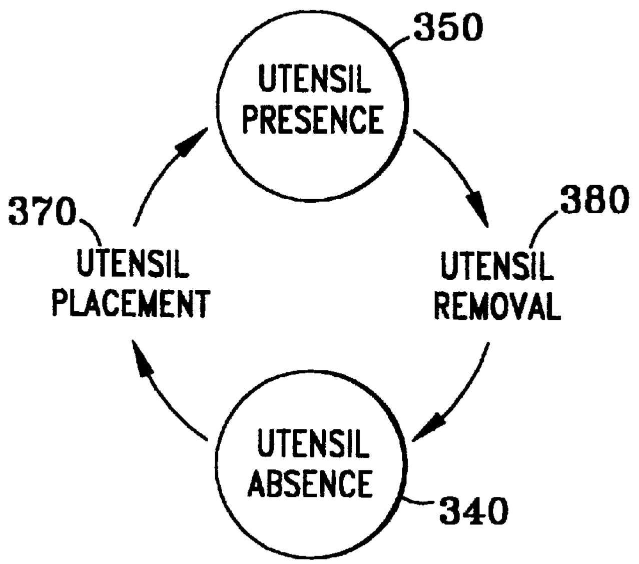
FIG. 8 illustrates the utensil state properties of FIG. 7 in greater detail.

FIG. 8 illustrates in more detail the relationship between two utensil states associated with any utensil in combination with a cooktop. A utensil is either in a presence state 350 or an absence state 340 with respect to a cooktop surface, or the utensil is transitioning between the presence and absence states. The step of transitioning comprises either utensil placement 370 or utensil removal 380. For each utensil property, an interrogation scheme is provided herein.

Figure 9:
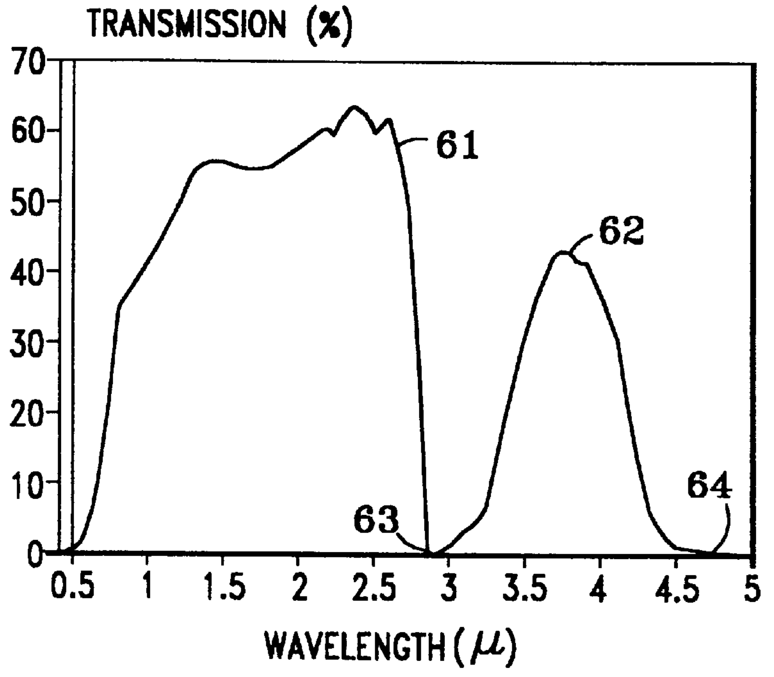
FIG. 9 illustrates typical signal transmission properties of a typical glass-ceramic cooktop.

FIG. 9. illustrates transmission characteristics of a typical glass-ceramic cooktop. The two broad peak areas 61 and 62 represent relatively good transmission regions. Between these peaks 61 and 62 is a narrow region 63 representing substantially no transmission. Peak 62 leads to a region 64 of wavelength where there is no longer any appreciable transmission. For the example shown in FIG. 9, transmission beyond 5 $\mu$m is essentially zero. The preferred sensitivity wavelength range for the optical detectors is in a range wherein transmission through the glass ceramic is substantially greater than zero, such as the two broad peak areas 61 and 62.

In general, utensil property interrogation is defined herein as a sequence of activation of at least one optical light source such that optical radiation detected during the sequence is processed to provide information about the utensil property. Such interrogation can be done with active control of the light source; or it can be done passively using on/off cycling or cycling between the energized and de-energized states of the energy source, provided by a separate power control. For passive interrogation, an additional power or light level signal input would aid in determining the light source activation. Additional examples of passive control include the use of an ambient light source as well as use of the energy source that is already on. Alternative passive control comprises the detection of transitions of the state property such that the radiation needs to be monitored only when a light source is on. Alternatively, a combination of light sources may be used to implement utensil property interrogation.

As noted hereinabove, ambient lighting affected by the cooking utensil may be used to detect the presence of, the absence of, and/or the characteristics of a utensil on the cooktop when the radiating energy source is not on. This is accomplished by using a plurality of separate sensors and an algorithmic approach that monitors the change in the signal emanating from the sensor. Likewise as described hereinabove, another alternative embodiment includes a separate light source, such as an LED for providing a source of the radiation reflected from the cooking utensil that is independent of the energy source.

As described, the radiation reflected from the cooking utensil is utilized to determine the size or type of cooking utensil. Such information is used to control the energy source with respect to these specific characteristics of the cooking utensil. If the energy source is used as the source of radiation reflected from the cooking utensil, the energy source is initially turned on to provide radiation which is reflected from the cooking utensil, which is then utilized to determine the cooking utensil properties based upon the sensor output. This information is used to select a combination of radiating energy sources, assuming there is more than one source, that optimally matches the cooking utensil size.

Signal communication among different heat sources and sensors can be arranged as a single, multiplexing interface. Multiplexing can be accomplished electronically or optically.

Utensil Presence/Absence Property

The utensil presence/absence property is monitored by detecting the difference between the reflected radiation due to the utensil's presence and the unaffected radiation when the utensil is absent. In particular, this is illustrated in detail for the case of the through-the-glass option with the detector located below the glass using the following definitions: $E_g$=Emission from the Glass; $R_g$=Reflection from the Glass; and $R_p$=Reflection from the Utensil.

In one embodiment, $R_p$ is a value indicating whether a utensil is present. In order to monitor that value, it is necessary to eliminate the contributions of $E_g$ and $R_g$. Because the reflection is only present when the light source is on, $E_g$ is eliminated by taking the difference between a reading when the light source is on and when the light source is off. Specifically, the difference is detected between $P_1=E_g+R_g+R_p$ and $P_2=E_g$ using the interrogation scheme as described herein with a signal pattern such as illustrated in FIG. 10.

Figure 10:
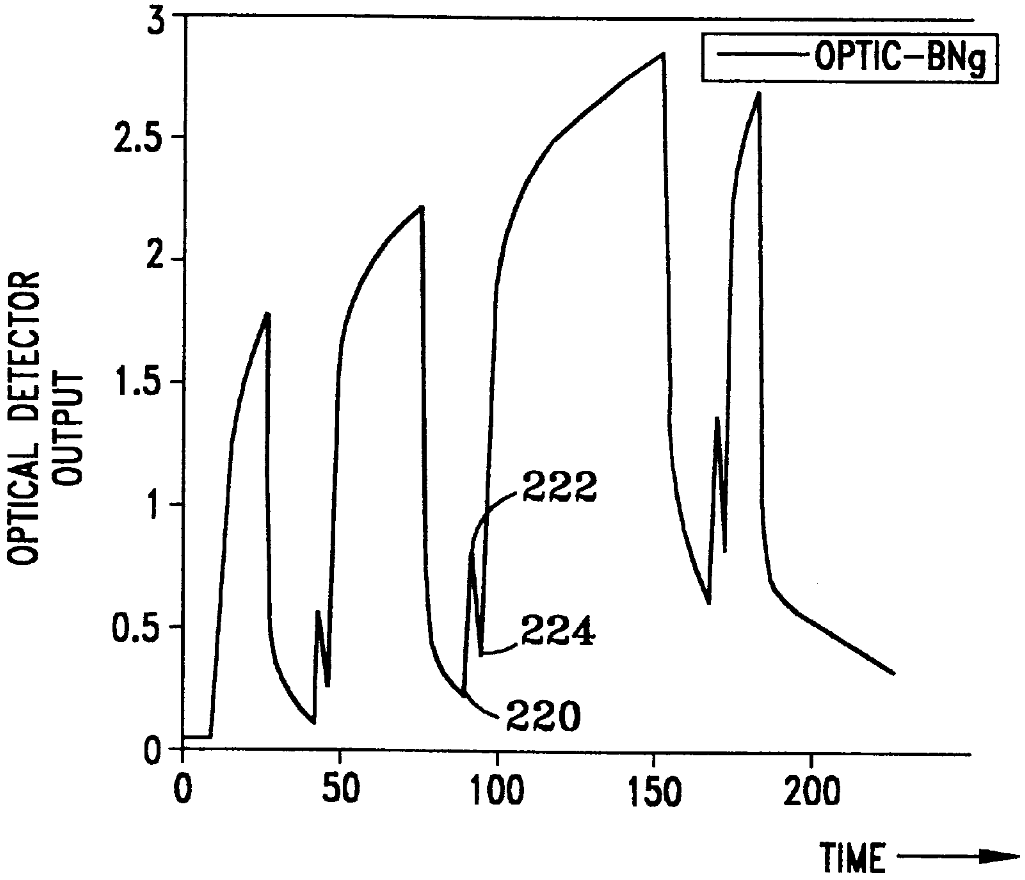
FIG. 10 illustrates a typical optical data pattern associated with a utensil's presence/absence property as the optical radiation source is turned on and off.

FIG. 10 illustrates a typical signal pattern associated with the through-the-cooktop surface property of a utensil's presence/absence. At 220, the light source (i.e., the energy source in a preferred embodiment) has been turned off to obtain a baseline reading. FIG. 10 includes three different repetitions of the interrogation (i.e., represented by horizontal axis readings at approximately 40, 85, and 165), representing interrogation carried out several times at different glass temperatures. The optical sensor output obtained at 224 when the light source has been turned on gives the reading $P_1$. The optical sensor output obtained at 224 when the light source has been turned off is used to obtain the reading $P_2$. The difference of the readings (i.e., $P_1-P_2=R_g+R_p$) is used by the processor in order to determine if the radiation is substantially larger than $R_g$ to deduce the utensil presence/absence utensil property.

The next step in the interrogation process is to eliminate the contribution of $R_g$ from the measurement. Three alternative embodiments include the following: using a known $R_g$; estimating or measuring the value of $R_g$; and proactively minimizing the value of $R_g$ for minimal impact. The former is accomplished by using at least one of prior glass reflection measurements and calibration techniques.

In one embodiment, $P_1-P_2-R_g^{est}$ is compared to zero, where $R_g^{est}$ is an estimated value of the reflection due to the glass. In another embodiment, $R_g$ is measured using two different wavelength ranges and two different detectors or optical radiation sources. Because of the known reflectivity curve associated with glass, a reading at one wavelength may be used to extrapolate the value at another wavelength. In yet another embodiment, $R_g$ is measured using two different wavelength ranges by controlling the energy source, using different values of power to obtain radiation emitted by the energy source in two different wavelength ranges. In all of the above cases, the second wavelength range is selected to be in the range where the glass is opaque. Consequently, in this latter range, independence from the effects of the utensil is achieved, i.e. independence from $R_p$. The second wavelength range is also chosen such that the reflectivity $R_g$ of the glass is substantially the same as that in the sensing range or directly related to it (such as by proportionality).

Alternatively, the range of wavelength of sensitivity of the detector is chosen such that $R_g$ is as small as possible. As yet another alternative, $R_g$ is measured when there is no utensil present and during a period of no cooking.

Optionally, the calculation algorithm for the placement/removal property includes the detection of a calibration signal value during either a time of non-use or during a designated calibration period. A difference is calculated between the current signal value and the calibration signal value.

Utensil Placement/Removal Property and Utensil Type Property

Utensil placement and removal comprise the transitions between the utensil's presence and absence states, as illustrated in FIG. 8. These transitions are detected by monitoring the changes in reflected or affected light caused by movement of the utensil on or off the burner.

Figure 11:
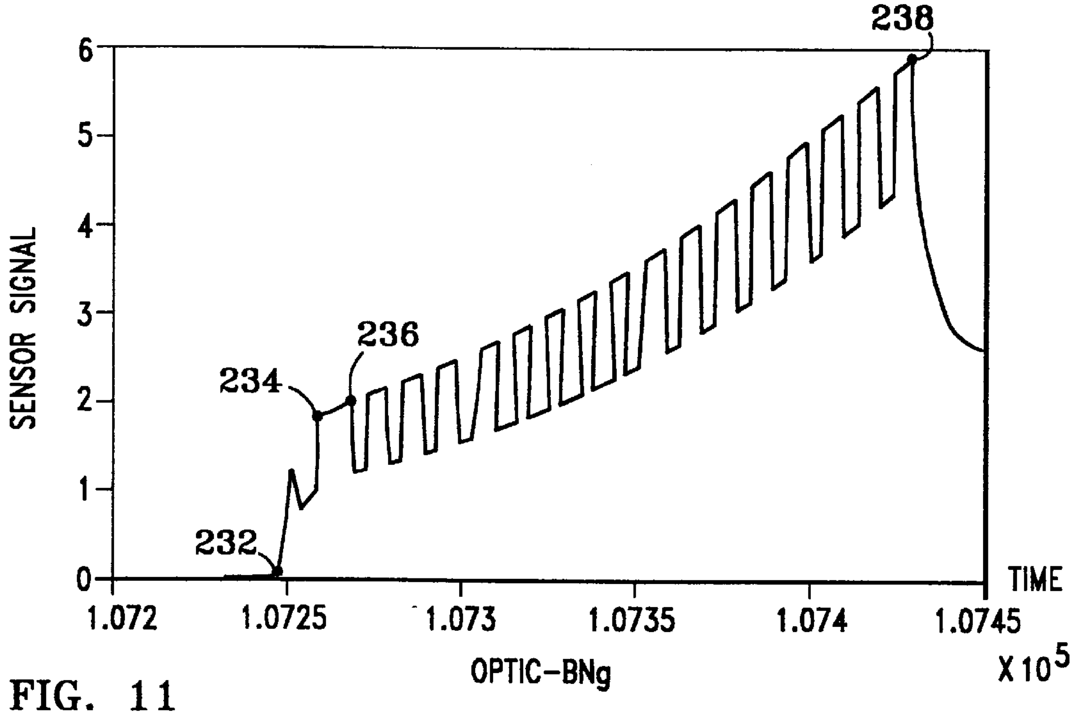
FIG. 11 illustrates optical data for dark cooking utensils.
Figure 12:
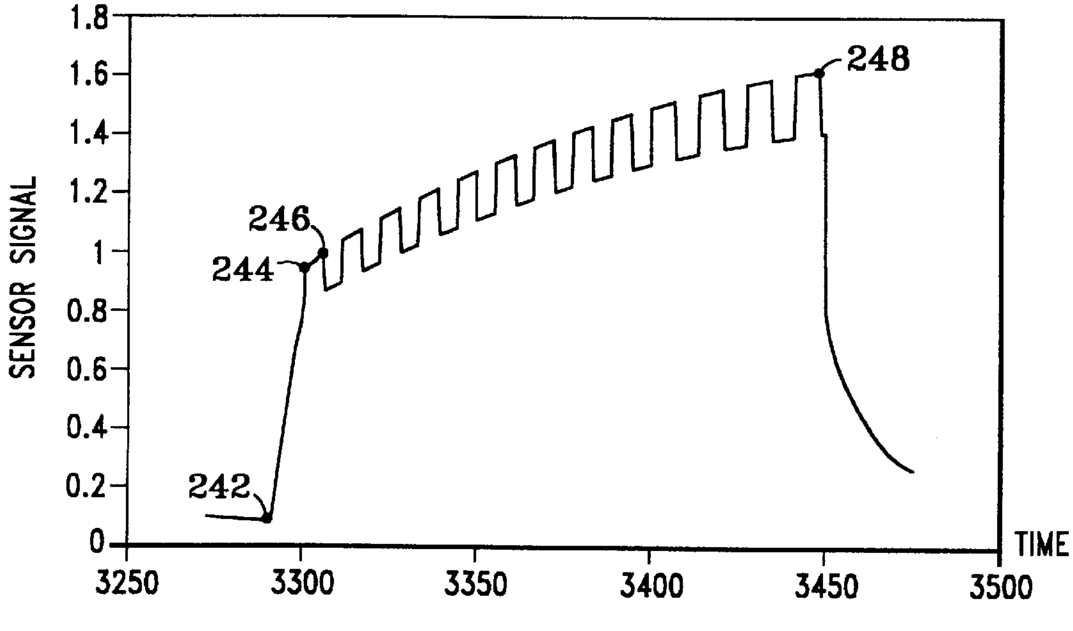
FIG. 12 illustrates optical data for shiny cooking utensils.

FIGS. 11 and 12 illustrate typical signal patterns which indicate placement and removal optical data for dark and shiny cooking utensils, respectively. FIG. 11 corresponds to a dark, optically-absorbing utensil, such as a Calphalon™ utensil. FIG. 12 corresponds to a shiny, optically-reflecting utensil, such as a RevereWare™ utensil. In FIGS. 11 and 12, points 232 and 242 represent the times at which the radiating energy source is initially turned on. Points 234 and 244 represent placement of the cooking utensil on the cooktop. Points 236 and 246 represent removal of the utensil from the cooktop. Points 118 and 128 represent removal of the cooking utensil from the cooktop and turning off of the radiating energy source. As can be seen, the sensor signal varies depending on the type of cooking utensil and the time for which the radiating energy source has been turned on.

FIGS. 11 and 12 illustrate the case in which the cooking utensil is already present when the radiating energy source is first turned on. There is a substantially immediate jump in the signal pattern at points 232 and 242 when the heat source is turned on, and there is a proportional drop in the signal pattern at points 238 and 248 when the heat source is turned off.

Figure 13:
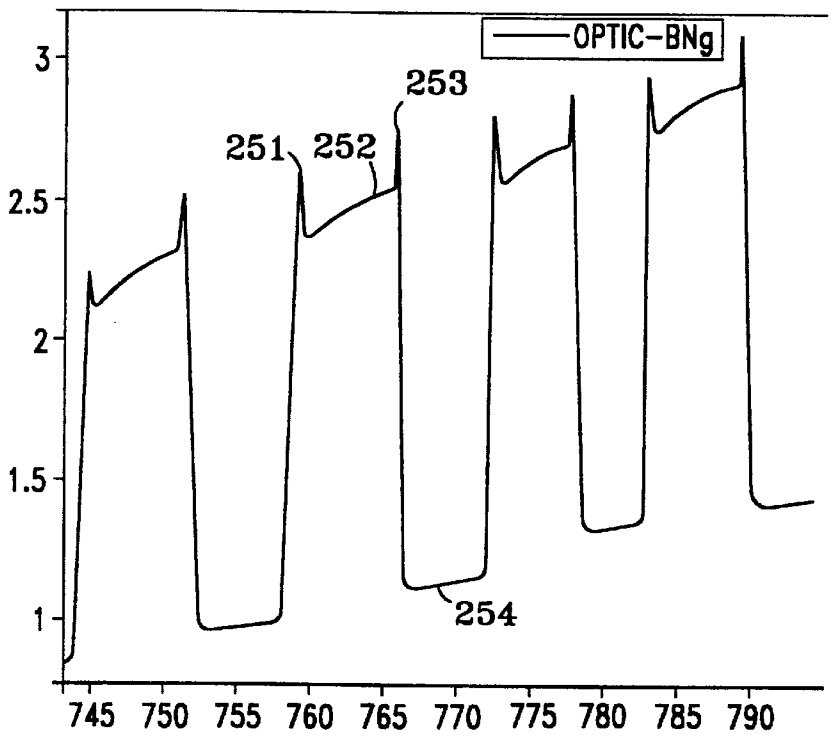
FIG. 13 further illustrates the data of FIGS. 11 and 12, in particular illustrating a signal pattern associated with the utensil placement and removal property.

FIG. 13 shows a typical signal pattern associated with the through-the-cooktop surface property of cooking utensil placement/removal. For the interrogation phase, no controller logic is necessary because interrogation is inherent in the action by the user of moving the cooking utensil during the placement and removal of the utensil. FIG. 13 shows a signal pattern illustrating a characteristic overshoot 251 as the utensil is being placed and a characteristic overshoot 253 as the utensil is being removed. The overshoot is dependent on the type and size of the cooking utensil, as well as the rate and degree of actual movement of the utensil during the process of placement or removal. The magnitude of the signal rise or drop for the dark cooking utensil of FIG. 11 is larger than that of the shiny utensil of FIG. 12. Thus, additional properties of the cooking utensil can be obtained from the extent and shape of these overshoots.

Utensil Size Property

The interrogation scheme for the utensil size property is as follows for a single burner configuration that includes inner and outer burners. Step 1: the inner burner is turned on for a period of time $T_{on}$ (e.g., 5–15 seconds), and is turned off for another period of time $T_{off}$ (e.g., 2–10 seconds). Step 2: the outer, ring-shaped part of the burner is turned on for a period of time $T_{on}$ (e.g., 5–15 seconds), and is turned off for another period of time $T_{off}$ (e.g., 2–10 seconds). Step 3: both the inner and outer parts of the burner are turned on for another period of time $T_{on}$ (e.g., 5–15 seconds), and are turned off for another period of time, $T_{off}$ (e.g., 2–10 seconds).

Figure 14:
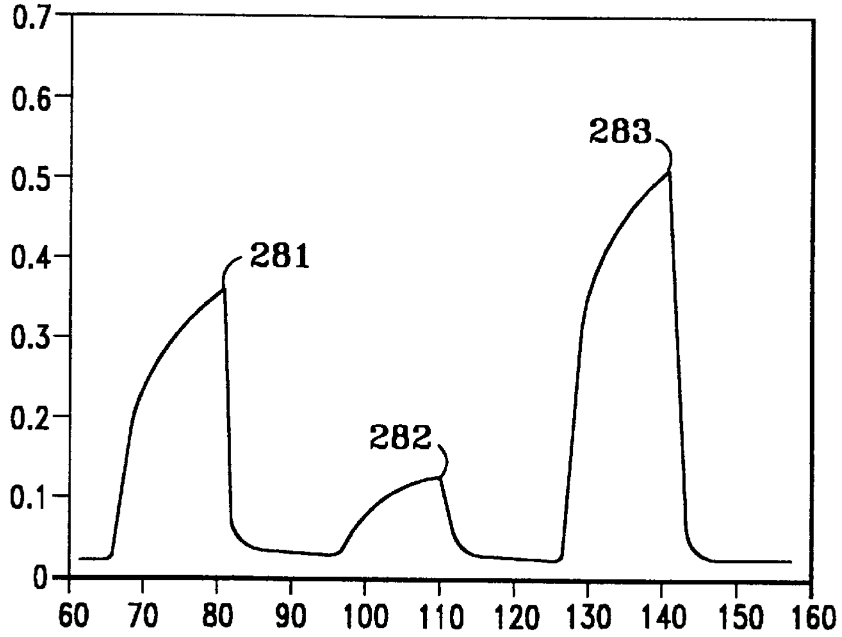
FIG. 14 illustrates a signal pattern associated with the utensil size property as the optical radiation source is turned on and off.

FIG. 14 shows a typical signal pattern associated with the through-the-cooktop surface property of utensil size, in particular illustrating the signal for each of the above-described steps 1–3. The signal rises rapidly when one or both burners are turned on, and then drops when the burners are turned off. Signal peak 281 corresponds to the inner burner being turned on. Peak 282 corresponds to the outer burner being turned on, and peak 283 corresponds to both burners being turned on.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A system for detecting properties of a cooking utensil on a solid-surface cooktop of a type having at least one controllable energy source coupled thereto for providing energy for heating the cooking utensil and any contents thereof, the system comprising:

at least one optical radiation source for emitting radiation toward the cooktop and the cooking utensil;

at least one sensor positioned below the cooktop for detecting the radiation emitted from the at least one optical radiation source, the detected radiation being affected by the cooking utensil and passing through the cooktop, the at least one sensor having a predetermined sensitivity range depending on the material composition of the cooktop, the at least one sensor generating detector signals indicative of the detected radiation; and a processor connected to the at least one sensor and receiving the detector signals, the processor providing processor signals indicative of at least one property of the cooking utensil from at least the detector signals.

2. The system of claim 1 wherein the at least one property is selected from a group consisting of utensil absence, utensil presence, utensil placement, utensil removal, utensil size and utensil type.

3. The system of claim 1 wherein the at least one sensor detects infrared radiation including a wavelength range affected by the cooking utensil.

4. The system of claim 3, further comprising at least one filter connected to the at least one sensor for limiting the wavelength range of infrared radiation detected by the at least one sensor to at least one of a transparent wavelength region and a minimum reflectivity region based on material characteristics of the cooktop.

5. The system of claim 1 wherein the at least one optical radiation source comprises the at least one controllable energy source, the system further comprising a controller connected to the at least one optical radiation source and the at least one sensor for controlling optical radiation generated by the optical radiation source based on the detector signals.

6. The system of claim 1 wherein the cooktop comprises a glass-ceramic material and wherein the at least one optical radiation source emits optical radiation having a wavelength range corresponding to at least one transmission range of the glass-ceramic material and a broad wavelength range.

7. The system of claim 1 wherein the at least one optical radiation source comprises a controllable light source separate from the at least one controllable energy source.

8. The system of claim 1 wherein the at least one optical radiation source comprises light source positioned above the cooktop surface.

9. The system of claim 1 wherein the detector is selected from a group consisting of thermal detectors and photon detectors.

10. The system of claim 1, further comprising a controller connected to the at least one controllable energy source and the at least one sensor for controlling the at least one controllable energy source based on the detected signals.

11. The system of claim 1, further comprising at least one indicator coupled to the processor for providing output signals indicative of the detected properties of the cooking utensil, the at least one indicator being selected from a group consisting of visual indicators, audible indicators and data indicators.

12. The system of claim 1 wherein the at least one sensor senses radiation from a field of view of the cooktop surface, the field of view comprising at least a portion of the cooktop surface.

13. The system of claim 1 wherein the at least one sensor comprises at least two detectors, each detector being sensitive to a different wavelength range.

14. The system of claim 1 wherein the at least one sensor comprises at least one detector for detecting the radiation emitted from the at least one optical radiation source.

15. A method for detecting properties of a cooking utensil on a solid-surface cooktop of a type having at least one controllable energy source coupled thereto for providing energy for heating the cooking utensil and any contents thereof, the steps of the method comprising:

providing an optical radiation source and directing radiation therefrom toward the cooking utensil and the cooktop;

detecting radiation provided from the optical radiation source using at least one sensor, the detected radiation being affected by the utensil and passing through the cooktop, the at least one sensor providing detector signals indicative of the detected radiation; and comparing the detector signals to predetermined signal patterns for determining at least one property of the cooking utensil, the at least one property being selected from a group consisting of the cooking utensil's presence state, absence state, placement, removal, type, and size.

16. The method of claim 15, further comprising generating control signals for controlling the optical radiation source to generate the radiation detected by the at least one sensor.

17. The method of claim 15, further comprising generating control signals for controlling the energy source based on the detector signals.

18. The method of claim 15 wherein the detector signals are indicative of the cooking utensil's presence and absence states, the method further comprising the steps of:

measuring first and second radiation values with the optical radiation source on and off, respectively;

measuring a cooktop surface reflectivity value to determine utensil reflection;

calculating the difference between the first and second radiation values in order to provide a subtracted radiation value which avoids a solid surface emissivity effect; and subtracting the measured reflectivity value from the radiation difference value to yield a cooking utensil reflection value.

19. The method of claim 15 wherein the detector signals are indicative of the cooking utensil's presence and absence states, the method further comprising the steps of:

measuring a radiation value with the optical radiation source on;

measuring a surface temperature signal in order to estimate radiation due to surface emissivity;

measuring solid surface reflectivity;

subtracting the measured surface temperature signal from the measured radiation value to yield a calculated value; and subtracting the measured solid surface reflectivity from the calculated value to yield cooking utensil reflection.

20. The method of claim 19 wherein the sensor has a restricted wavelength sensitivity such that a reflectivity value of the cooktop surface is significantly smaller than the cooking utensil reflection value.

21. The method of claim 19, further comprising the steps of:

detecting a reference signal value during one of a period of non-use and a designated calibration period;

detecting a current signal value; and calculating a difference between the current signal value and the reference signal value such that the calculated difference represents the cooking utensil state.

22. The method of claim 19 wherein the comparing step comprises an evolutionary algorithm comprising updating algorithm comparison rules in accordance with the results of each comparing step.

23. The method of claim 19 wherein the step of measuring solid surface reflectivity comprises:

generating at previous time periods at least one previous solid surface reflectivity signal using a second sensor selected to detect radiation in a second wavelength range; and extrapolating the at least one previous solid surface reflectivity signal in the second wavelength range to calculate solid surface reflectivity signal values.

24. The method of claim 19 wherein a plurality of sensors perform the detecting step, each sensor being located at a respective cooking utensil location, the method further comprising the steps of:

generating at least one detector signal from each sensor; and calculating a difference between respective combinations of the detector signals in order to determine cooking utensil presence at any cooking utensil location.

25. The method of claim 15 wherein the detector signals are indicative of the cooking utensil's placement/removal property, the method further comprising the step of detecting an change in at least one detector signal, the change indicating placement or removal of a cooking utensil on the cooktop.

26. The method of claim 15 wherein a plurality of sensors is used to distinguish the change due to utensil placement or removal due to a change in lighting.

27. The method of claim 25, further comprising comparing the detector signals to at least one of predetermined signal patterns indicative of movement and lighting changes in order to distinguish between lighting changes and utensil movement.

28. The method of claim 15 wherein the detector signals are indicative of the utensil type property, and the predetermined signal patterns are indicative of the cooking utensil type property ranging from shiny to dark.

29. The method of claim 15 wherein the detector signals are indicative of the utensil size property and wherein the at least one energy source is of a type having a burner with first and second rings, the method further comprising the steps of:

controlling the first and second rings so as to cycle the first and second rings through a plurality of combinations of energized and de-energized states;

detecting radiation patterns corresponding to respective ones of the combinations of energized and de-energized states;

generating signal patterns corresponding to the detected radiation patterns; and calculating differences between the signal patterns to determine the portion of the burner that is covered by the cooking utensil, thereby determining utensil size.

30. The method of claim 29 wherein the sensor includes at least one detector for detecting radiation, each detector being located off-center with respect to a burner so that each detector detects a portion of a cooking utensil located directly over the detector, thereby determining utensil size.

31. The method of claim 29 wherein the step of calculating differences between the signal patterns includes comparing differences between amplitudes of the detected radiation patterns and pre-determined amplitudes.

32. A system for detecting properties of a cooking utensil on a solid-surface cooktop having a controllable energy source positioned proximate to the cooktop for providing energy to heat the cooking utensil and any contents thereof, the system comprising:

an optical radiation source for emitting radiation toward the cooktop and the cooking utensil;

a sensor positioned below the cooktop, the sensor comprising:

a radiation collector for collecting the radiation emitted from the optical radiation source, the collected radiation being affected by the cooking utensil and passing through the cooktop;

a transmission path connected to the radiation collector for directing the collected radiation;

a filter connected to the transmission path for filtering the directed radiation into a predetermined wavelength range affected by the cooktop; and a detector connected to the filter for detecting the radiation filtered by the filter, the detector generating detector signals indicative of the filtered radiation; and a processor connected to the sensor for receiving the detector signals, the processor providing processor signals indicative of at least one property of the cooking utensil from at least the detector signals.

33. The system of claim 32 wherein the at least one property of the cooking utensil is selected from the group consisting of utensil absence, utensil presence, utensil removal, utensil size and utensil type.

34. The system of claim 32 further comprising an additional sensor connected to the processor wherein the additional sensor detects the radiation from the optical radiation source having a wavelength different from the predetermined wavelength range of the radiation.

* * * * *